United States Patent
Mohan et al.

(10) Patent No.: US 11,725,924 B2
(45) Date of Patent: Aug. 15, 2023

(54) CONTROLLING MECHANICAL SYSTEMS BASED ON NATURAL LANGUAGE INPUT

(71) Applicant: PALO ALTO RESEARCH CENTER INCORPORATED, Palo Alto, CA (US)

(72) Inventors: Shiwali Mohan, Palo Alto, CA (US); Matthew Klenk, San Francisco, CA (US); Matthew Shreve, Campbell, CA (US); Aaron Ang, Mountain View, CA (US); John Turner Maxwell, III, Santa Clara, CA (US); Kent Evans, Cupertino, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/518,417

(22) Filed: Nov. 3, 2021

(65) Prior Publication Data

US 2023/0051136 A1     Feb. 16, 2023

Related U.S. Application Data

(60) Provisional application No. 63/231,682, filed on Aug. 10, 2021.

(51) Int. Cl.
| | | |
|---|---|---|
| G05B 15/02 | (2006.01) | |
| G01B 7/00 | (2006.01) | |
| G01B 7/02 | (2006.01) | |
| G06F 40/10 | (2020.01) | |
| G06F 40/40 | (2020.01) | |
| G06F 18/2137 | (2023.01) | |
| B25J 13/00 | (2006.01) | |
| B25J 13/08 | (2006.01) | |
| B25J 9/16 | (2006.01) | |

(52) U.S. Cl.
CPC .............. *G01B 7/003* (2013.01); *B25J 9/163* (2013.01); *B25J 9/1664* (2013.01); *B25J 13/003* (2013.01); *B25J 13/089* (2013.01); *G01B 7/023* (2013.01); *G05B 15/02* (2013.01); *G06F 18/21375* (2023.01); *G06F 40/10* (2020.01); *G06F 40/40* (2020.01)

(58) Field of Classification Search
CPC ................................ G05B 15/02; G06F 40/40
See application file for complete search history.

(56) References Cited

U.S. PATENT DOCUMENTS 6,789,054 B1 * 9/2004 Makhlouf ................. G06F 8/10
 703/22
2021/0060778 A1 * 3/2021 Butterfoss .............. B25J 9/1653

* cited by examiner

*Primary Examiner* — Michael W Choi
(74) *Attorney, Agent, or Firm* — Womble Bond Dickinson (US) LLP

(57) ABSTRACT

A method is provided. The method includes obtaining an enhanced state graph. The enhanced state graph represents a set of objects within an environment and a set of positions of the set of objects. The enhanced state graph includes a set of object nodes, a set of property nodes and a set of goal nodes to represent a set of objectives. The method also includes generating a set of instructions for a set of mechanical systems based on the enhanced state graph. The set of mechanical systems is configured to interact with one or more of the set of objects within the environment. The method further includes operating the set of mechanical systems to achieve the set of objectives based on the set of instructions.

18 Claims, 10 Drawing Sheets

CONTROLLING MECHANICAL SYSTEMS BASED ON NATURAL LANGUAGE INPUT

CROSS-REFERENCE TO RELATED APPLICATIONS

This application claims priority from and the benefit of U.S. Provisional Patent Application No. 63/231,682 filed on Aug. 10, 2021, the entire contents of which are incorporated herein by reference in their entirety.

STATEMENT OF GOVERNMENT RIGHTS

This invention was made with government support under Contract No. HR00111990056 awarded by the U.S. Department of Defense. The government has certain rights in the invention.

TECHNICAL FIELD

Implementations of the present disclosure relate to interacting with machines or devices, and more particularly to interacting with machines or devices using natural language input.

BACKGROUND

Machines, devices, sensors, etc., are becoming more and more prevalent in human environments. For example, robotic systems are often used to move boxes in warehouses. Robotic systems are often used to deliver items, provide care and/or services, for users, etc. Autonomous vehicles may be used to transport passengers or objects to different locations.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As machines, devices, sensors, etc., become prevalent in human environments, the challenge of enabling natural communication between humans and these devices is important. For example, robotic systems are often used to move boxes in warehouses. Robotic systems are often used to deliver items, provide care and/or services, for users, etc. Autonomous vehicles may be used to transport passengers or objects to different locations.

Users (e.g., humans) may interact with these machines/devices to instruct them to perform specific tasks. For example, a user may type in instructions via a command line interface. In another example, a user may give verbal commands via a microphone or other audio input device. The commands and instructions used by these machines/devices is often in an unnatural format for users. For example, specific syntax and/or grammar may be used by these machines/devices to instruct them to perform different operations. However, natural language is the primary modality of communication between users. This makes it more difficult for users to interact with these devices/machines when trying to perform certain operations or achieve certain goals/objectives.

Thus, if may be useful for a system to allow a user to natural language inputs to indicate goals/objectives to be achieved within an environment. The system should be able to receive sensor data and identify objects within an environment based on the environment. The system should also be able to determine which objects are referred to by a user when the user states an objective/goal using natural language. The system should also be able to identify mechanical systems that may be used to perform a requested objective/goal and instruct the mechanical systems to perform the requested objective/goal.

Figure 1:
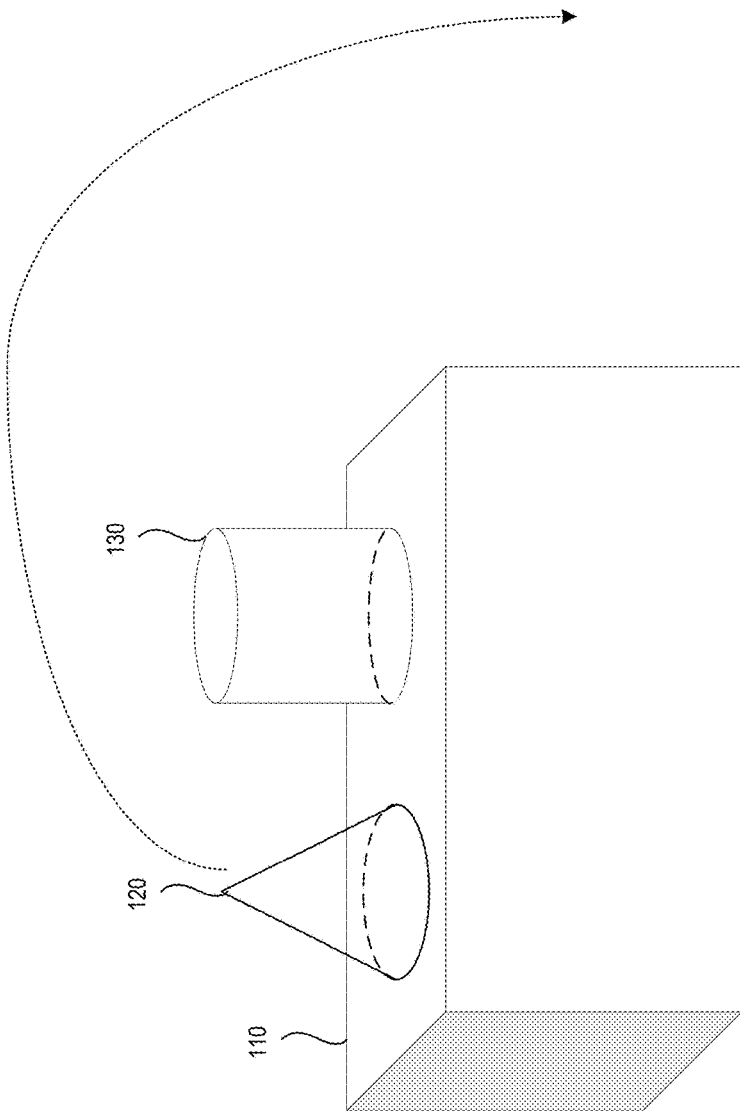
FIG. 1 is a diagram illustrating an example environment, in accordance with some embodiments of the present disclosure.

FIG. 1 is a diagram illustrating an example environment 100, in accordance with some embodiments of the present disclosure. The environment 100 may be physical environment or location where various objects may be located. For example, the environment 100 may include object 110 (e.g., a wooden box, a cardboard box, etc.), object 120 (e.g., a cone), and object 130 (e.g., a cylinder).

A user may want to achieve a goal, result, objective, etc., within the environment 100. For example, a user may want to move object 120 (e.g., the cone) off of the object 110 (e.g., the box) and to the right of object 130 (e.g., the cylinder), as indicated by the dotted arrow. The environment may include various machines, devices, etc., such as mechanical systems that may be used to achieve these objectives.

As discussed above, a user may provide instructions to devices to achieve a goal, objective, results, etc. For example, if the user wants to move the object 120 to the right of object 130, the user may provide the instructions "pick-up (obj-23) & place (obj-23, [x, y, z])" via a command line interface. The instructions illustrated above are not a natural form of communication for users (e.g., humans). Thus, it may be more difficult for a user to achieve their goals using these devices/machines.

Figure 2:
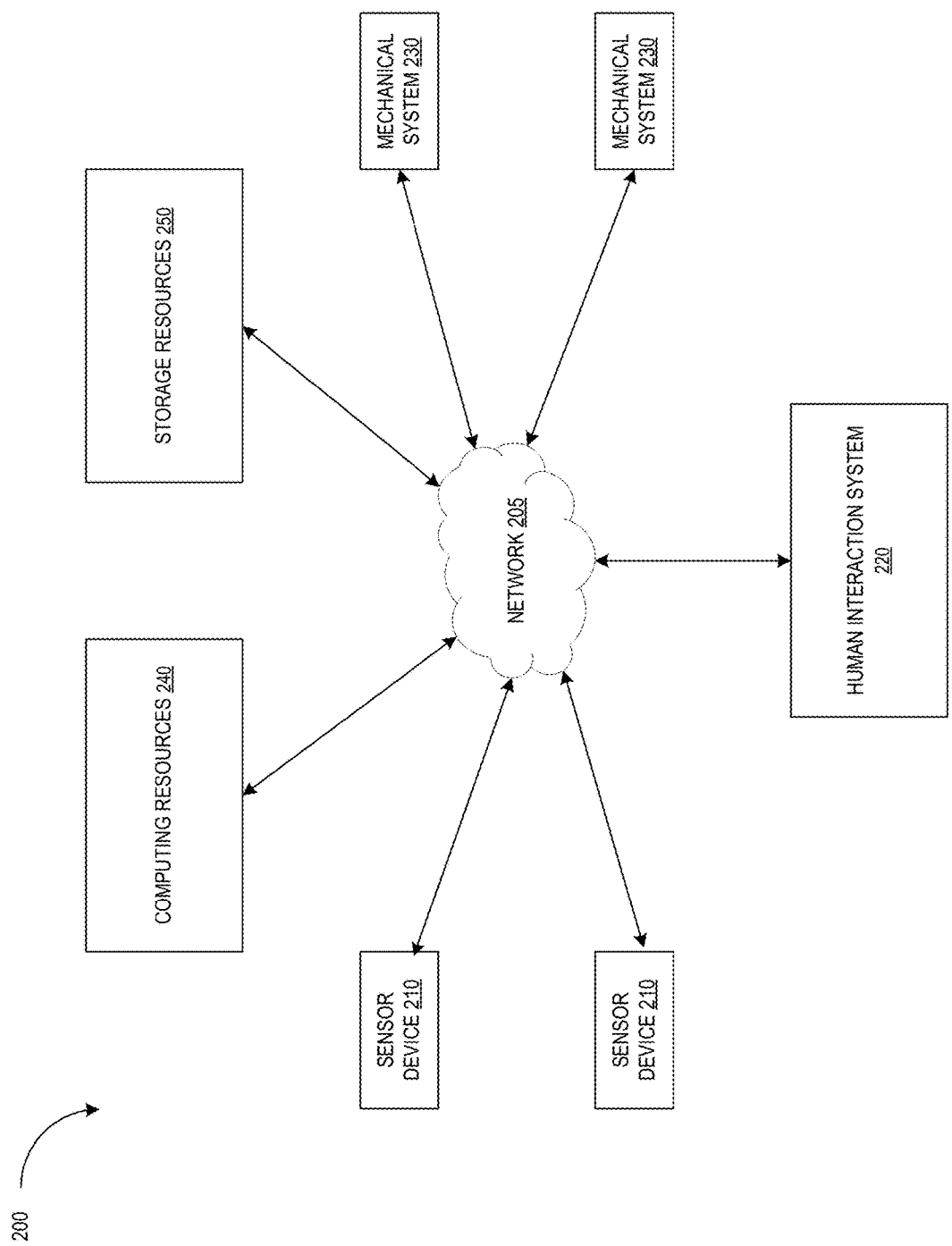
FIG. 2 is a diagram illustrating an example system architecture, in accordance with some embodiments of the present disclosure.

FIG. 2 is a diagram illustrating an example system architecture 200, in accordance with some embodiments of the present disclosure. The system architecture 200 may be located within an environment (e.g., a physical environment, a location, etc.) such as environment 100 illustrated in FIG. 1. Portions of the system architecture 200 (e.g., the human interaction system 220) may be located separate from the environment. The system architecture 200 includes any number of sensor devices 210 (e.g., one or more sensor devices 210), a human interaction system 220, and any number of mechanical systems 230 (e.g., one or more mechanical systems). The system architecture 200 also (optionally) includes computing resources 240 and storage resources 250. Although specific components, modules, systems, devices, etc., are disclosed in system 200, it should be appreciated that such components are examples. That is, embodiments of the present invention are well suited to having various other components or variations of the components recited in system 200. It is appreciated that the components in system 200 may operate with other components than those presented, and that not all of the components of system 200 may be required to achieve the goals of system 200.

As discussed above, computing devices, sensors, and mechanical devices (e.g., robotic systems) are becoming more and more prevalent and users may interact with these devices/systems more frequently. Although a user may provide instructions to these devices, these users are often not in a natural form of communication and/or not in a natural language for users. However, many users prefer to user natural communication (e.g., natural language communication) to interact with these devices/systems, rather than using a machine specific language/syntax.

In one embodiment, the human interaction system 220 may help enable, facilitate, etc., effective communication between these devices/systems and users. The human interaction system 220 may allow a user to provide natural language input to indicate an objective or goal. The human interaction system 220 is able to process sensor data to identify objects that are indicated by the user and goals associated with those objects. The human interaction system 220 may be able to translate user requests into instructions that may cause mechanical systems 230 to perform various actions, operations, etc., to achieve or accomplish the goals/objectives.

In one embodiment, sensor devices 210 may be devices, components, modules, etc., that may collect, obtain, detect, observe, etc., the environment around the sensor device 210 (e.g., the surrounding environment). Each of the sensor device 210 may obtain, collect, detect, observe, etc., sensor data and the sensor data may indicate information about the environment around the sensor device 210 and/or about other objects within the environment. For example, a camera may collect, obtain, generate, etc., sensor data (e.g., video data) that depicts objects (e.g., tables, boxes, plants, animals, people, etc.) within a certain area or radius of the camera. In another example, a radar sensor may collect, obtain, generate, etc., sensor data that may indicate one or more objects within an environment, the size of the object, the speed/acceleration of the object, etc. The sensor data that is collected, detected, observed, etc., by the sensor device may be provided to the human interaction system 220 (e.g., may be transmitted to the human interaction system 220) via the network 205.

Examples of a sensor device 210 may include, but are not limited to, cameras (e.g., digital camera, video cameras), temperature sensors, humidity sensors, infrared sensors, ultraviolent sensors, a compass, a global positioning system (GPS) receiver/sensor, a light detection and ranging (LIDAR) device/sensor, radar sensors, ultrasonic sensors, motion/proximity sensors, pressure sensors, accelerometers, gyroscopes, weight sensors (e.g., scales), etc. A sensor device 210 may include multiple devices or components. For example, a single sensor device 210 may include a thermometer and a humidity sensor.

In one embodiment, the mechanical systems 230 may be devices, components, modules, etc., that may interact with the environment and/or object within the environment. For example, the mechanical systems 230 may move objects, come into physical contact with objects, etc. Examples of mechanical system 230 may be robotic systems (e.g., robotic arms, robotic carts, etc.), conveyors (e.g., conveyor belts), elevators, etc.

In one embodiment, the human interaction system 220 may obtain (e.g., receive) sensor data from one or more of the sensor devices 210. The human interaction system 220 may determine one or more positions, locations, etc., of various objects within the environment, based on the sensor data. The human interaction system 220 may also determine changes to the positions/locations of the various objects within the environment and/or changes to the objects themselves. For example, the human interaction system may determine whether an object is moving (e.g., whether a ball is rolling), changing in size (e.g., whether a bag is inflating/deflating), whether an object is changing color, etc. The sensor data may optionally include information and/or may indicate the positions, locations, etc., of the various objects within the environment.

In one embodiment, the human interaction system 220 may generate, determine, calculate, etc., a state graph that may indicate, represent, etc., the various objects within the environment, based on the sensor data (obtained from the sensor devices 210). For example, the state graph may represent the various objects within the environment. In another example, the state graph may indicate properties of an object (e.g., size, shape, color, weight, texture, etc.). In another embodiment, the state graph may also indicate, represent, etc., relationships between the objects. For example, the state graph may indicate that a first object is to the left of a second object. In another example, the state graph may indicate that an object is on top of a box, or located within a shelf.

In one embodiment, the human interaction system 220 may receive and/or process user input. The user input may be natural language input (e.g., a language or syntax that has evolved naturally in humans through use and repetition). The human interaction system 220 may perform processing on the user input. For example, the interaction system 220 may perform natural language processing on the user input. The user input may indicate instructions and/or requests from the user regarding how the mechanical systems 230 should interact with the one or more objects in the environment. The user input may also indicate instructions and/or requests for operations/actions for the mechanical system 230 to perform.

In one embodiment, human interaction system 220 may update, modify, enhance, etc., the state graph to generate an enhanced state graph, based on the user input. The enhanced state graph may include additional nodes and/or edges generated based on the user input, as discussed in more detail below. For example, the enhanced state graph may include additional property nodes or one or more goal nodes, based on the user input. In another example, the enhanced state graph may include additional nodes that may represent additional relationship between the objects, based on the user input.

In one embodiment, the human interaction system 220 may generate a set of instructions for one or more of the mechanical systems 230, based on the enhanced state graph. For example, the set of instructions may indicate and/or may cause one or more of the mechanical systems 230 to perform a sequence of actions, operations, functions, etc., to perform a goal or a request of the user (which the user provided via the user input).

In one embodiment, the human interaction system 220 may use computing resources 240 to perform various operations, functions, actions, tasks, etc. The computing resources 240 may include computing devices which may include hardware such as processing devices (e.g., processors, central processing units (CPUs), processing cores, graphics processing units (GPUS)), memory (e.g., random access memory (RAM), storage devices (e.g., hard-disk drive (HDD), solid-state drive (SSD), etc.), and other hardware devices (e.g., sound card, video card, etc.). The computing devices may comprise any suitable type of computing device or machine that has a programmable processor including, for example, server computers, desktop computers, rackmount servers, etc. In some examples, the computing devices may include a single machine or may include multiple interconnected machines (e.g., multiple servers configured in a cluster, cloud computing resources, etc.).

The computing resources 240 may also include virtual environments. In one embodiment, a virtual environment may be a virtual machine (VM) that may execute on a hypervisor which executes on top of the OS for a computing device. The hypervisor may also be referred to as a virtual machine monitor (VMM). A VM may be a software implementation of a machine (e.g., a software implementation of a computing device) that includes its own operating system (referred to as a guest OS) and executes application programs, applications, software. The hypervisor may be a component of an OS for a computing device, may run on top of the OS for a computing device, or may run directly on host hardware without the use of an OS. The hypervisor may manage system resources, including access to hardware devices such as physical processing devices (e.g., processors, CPUs, etc.), physical memory (e.g., RAM), storage device (e.g., HDDs, SSDs), and/or other devices (e.g., sound cards, video cards, etc.). The hypervisor may also emulate the hardware (or other physical resources) which may be used by the VMs to execute software/applications. The hypervisor may present other software (i.e., "guest" software) the abstraction of one or more virtual machines (VMs) that provide the same or different abstractions to various guest software (e.g., guest operating system, guest applications). A VM may execute guest software that uses an underlying emulation of the physical resources (e.g., virtual processors and guest memory).

In another embodiment, a virtual environment may be a container that may execute on a container engine which executes on top of the OS for a computing device, as discussed in more detail below. A container may be an isolated set of resources allocated to executing an application, software, and/or process independent from other applications, software, and/or processes. The host OS (e.g., an OS of the computing device) may use namespaces to isolate the resources of the containers from each other. A container may also be a virtualized object similar to virtual machines. However, a container may not implement separate guest OS (like a VM). The container may share the kernel, libraries, and binaries of the host OS with other containers that are executing on the computing device. The container engine may allow different containers to share the host OS (e.g., the OS kernel, binaries, libraries, etc.) of a computing device. The container engine may also facilitate interactions between the container and the resources of the computing device. The container engine may also be used to create, remove, and manage containers.

In one embodiment, the human interaction system 220 may use storage resources 250 to perform store data, access data, etc. The storage resources 250 may include various different types of storage devices, such as hard disk drives (HDDs), solid state drives (SSD), hybrid drives, storage area networks, storage arrays, etc. The storage resources 250 may also include cloud storage resources or platforms which allow for dynamic scaling of storage space.

Although the computing resources 240 and the storage resources 250 are illustrated separate from the data science system 110, one or more of the computing resources 240 and the storage resources 250 may be part of the data science system 110 in other embodiments. For example, the data science system 110 may include both the computing resources 240 and the storage resources 250.

Network 205 may be a public network (e.g., the internet), a private network (e.g., a local area network (LAN) or wide area network (WAN)), or a combination thereof. In one embodiment, network 205 may include a wired or a wireless infrastructure, which may be provided by one or more wireless communications systems, such as a Wi-Fi hotspot connected with the network 205 and/or a wireless carrier system that can be implemented using various data processing equipment, communication towers (e.g. cell towers), etc. The network 205 may carry communications (e.g., data, message, packets, frames, etc.) between the sensor device 210, human interaction system 220, mechanical system 230, computing resources 240 and/or storage resources 250.

Each component illustrated in FIG. 1 (e.g., sensor device 210, mechanical system 230, etc.) may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The human interaction system 220 may comprise any suitable type of computing device or machine that has a programmable processor including, for example, server computers, desktop computers, laptop computers, tablet computers, smartphones, set-top boxes, etc. In some examples, the human interaction system 220 may comprise a single machine or may include multiple interconnected machines (e.g., multiple servers, computing devices, etc., configured in a cluster). Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

Figure 3:
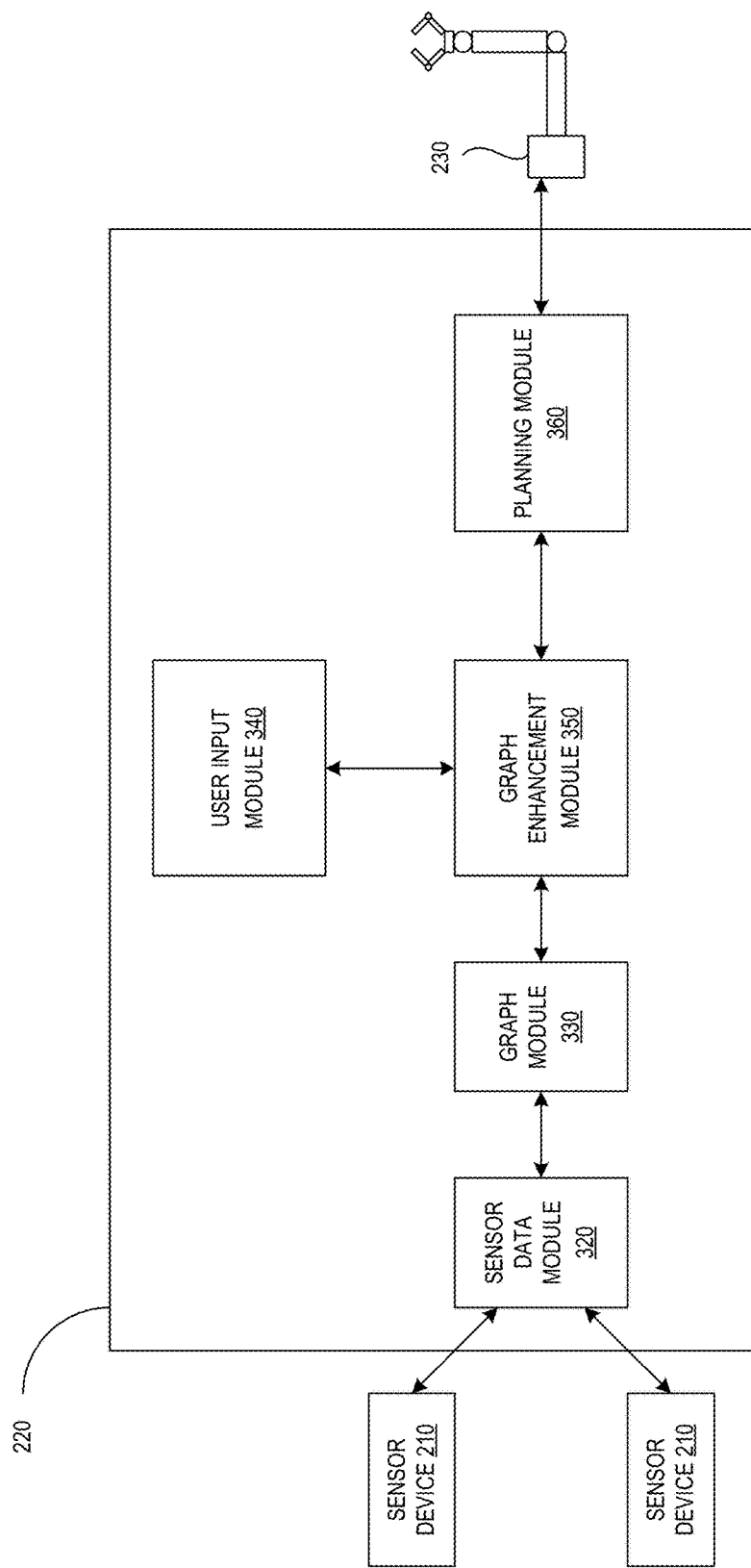
FIG. 3 is a diagram illustrating a human interaction system, in accordance with some embodiments of the present disclosure.

FIG. 3 is a diagram illustrating a human interaction system 220, in accordance with some embodiments of the present disclosure. The human interaction 220 may be communicatively coupled to one or more sensor device 210 via a network. The human interaction system 220 may also be coupled to one or more mechanical systems 230. The human interaction system 220 may include a sensor data module 320, a graph module 330, a user input module 340, a graph enhancement module 350, and a planning module 360. Some or all of modules 320 through 360 may be implemented in software, hardware, firmware, or a combination thereof. For example, one or more of modules 320 through 360 may be installed in persistent storage device, loaded into memory, and executed by one or more processors (not shown). In another example, one or more of modules 320 through 360 may be processing devices, such as an application specific integrated circuit (ASIC), a field programmable gate array (FPGA), VMs, containers, etc. Some of modules 320 through 360 may be integrated together as an integrated component. In addition, some of modules 320 through 360 be located in different computing devices (e.g., different server computers).

As discussed above, the mechanical systems 230 may be devices, components, modules, etc., that may interact with the environment and/or object within the environment. For example, the mechanical systems 230 may move objects, push objects, come into physical contact with the objects, etc. Examples of mechanical system 230 may be robotic systems (e.g., robotic arms, robotic carts, etc.), conveyors (e.g., conveyor belts), elevators, etc.

Also as discussed above, the sensor devices 210 may be devices, components, modules, etc., that may collect, obtain, detect, observe, etc., the environment where the sensor devices 210 are located. Each of the sensor device 210 may obtain, collect, detect, observer, etc., sensor data and the sensor data may indicate information about the environment and/or about other objects within the environment. In one embodiment, the sensor data module 320 may obtain sensor data from one or more of the sensor devices 210. For example, the sensor data module 320 may periodically request the sensor data from the one or more sensor device 210 (e.g., poll for the sensor data). In another example, the sensor data module 320 may periodically receive the sensor data from the sensor devices 210 (e.g., the sensor device 210 may periodically transmit the sensor data).

In one embodiment, the sensor data module 320 may determine one or more positions of the objects and one or more properties of the objects based on the sensor data. For example, the sensor data module 320 may process, analyze, etc., the sensor data to determine locations and/or positions of a set of objects (e.g., one or more objects) in the environment. In another example, the sensor data module 320 may determine one or more properties of the set of objects. For example, the sensor data module 320 may determine the size, shape, color, weight, texture, orientation, etc., of an object. The location/position of an object may also be represented as a property of the object. Various types of properties of the set of objects may be determined based on the sensor data. For example, physical properties or attributes (e.g., size, shape, weight, etc.) may be determined by the sensor data module 320. Physical properties may include various other types of properties, such as visual properties (e.g., color), tactile properties (e.g., weight, texture, etc.), and a state of an object (e.g., a light on the object is on/off).

In one embodiment, the sensor data module 320 may use one or more machine learning models to determine the set of properties and/or set of positions/locations for the objects in the environment. For example, the sensor data module 320 may provide the sensor data to machine learning models, such as neural networks, convolutional neural networks, etc. Although the present disclosure may refer to machine learning models, various techniques, functions, operations, algorithms, systems, etc., may be used to analyze the sensor data and determine the set of properties and/or locations for the objects in the environment. The sensor data module 320 may provide the set of properties and/or the set of positions for the set of objects (within the environment) to the graph module 330.

In one embodiment, the graph module 330 may generate a state graph based on the sensor data (generated by the sensor devices 210). For example, the graph module 330 may generate a state graph based on the set of properties and/or set of positions. The state graph may represent (or indicate) the set of objects and the set of positions for the set of objects, as discussed in more detail below. The state graph may include a set of objects nodes and each object node may represent one of the objects, as discussed in more detail below. The state graph may also include a set of property nodes. Each of the property nodes may represent (or indicate) a property of an object, as discussed in more detail below. The state graph may further include relationship nodes. Each relationship node may represent a relationship between two objects, also as discussed in more detail below. After generate, creating, determining, obtaining, etc., the state graph, the graph module 330 may provide the state graph to the graph enhancement module 350. The graph enhancement module 350 may update, modify, enhance, etc., the state graph with additional data (e.g., additional nodes, additional edges, etc.) to generate an enhanced state graph, as discussed in more detail below.

In one embodiment, the graph module 330 determine a set of spatial relationships (e.g., spatial information) between the set of objects. The spatial relationships may indicate how different objects are related to each other within the space of the environment. For example, a spatial relationship may indicate how two objects are positioned relative to each other (e.g., object A is to the left of object B). The graph module 330 determine a set of spatial relationships between the set of objects based on one or more spatial calculi. For example, the graph module 330 may use one or more of region connection calculus (RCC), RCC8, cardinal direction calculus (CDC), etc., to determine the spatial relationship between the set of objects. The graph module 330 may include, create, add, etc., relationship nodes (e.g., spatial relationship nodes) to represent the set of spatial relationships between the set of objects.

In one embodiment, the graph module 330 may determine one or more spatial relationships for each pair of objects in the set of objects. For example, if there are four objects A, B, C, and D, the graph module 330 may determine one or more spatial relationships for objects A and B, A and C, A and D, B and C, B and D, and C and D.

In one embodiment, the graph module 330 may determine temporal relationships (e.g., temporal information) for the set of objects in the environment. A temporal relationship may indicate changes to one or more of an object, a property of an object, and/or a position of an object over a period of time. A temporal relationship may be between two or more objects. For example, a temporal relationship may indicate that a first object is moving (e.g., rolling) towards a second object (or towards multiple other objects). A temporal relationship may also be for a single object. For example, a temporal relationship may indicate that an object is changing shape (e.g., expanding, melting, etc.) or is changing color (e.g., is changing color due to changes in temperature). The graph module 330 may include, create, add, etc., relationship nodes (e.g., temporal relationship nodes) to represent the set of spatial relationships between the set of objects.

In one embodiment, the user input module 340 may obtain (e.g., receive) user input. For example, the user input module 340 may receive audio data (e.g., voice data) from a user. In another example, the user input module 340 may receive an email or a text message from a user. The user input may be a natural language input. For example, the user input may be speech, text, etc., that a user may use for natural or common communication with other users (e.g., other people). The user input module 340 may process and/or analyze the user input to generate user input data representing a goal, request, and/or other information provided in the user input. For example, the user may provide the user input "move the cone off the box to the right of the cylinder." The user input module 340 may process and/or analyze the user input to identify the objects that the user input refers to and a goal/request of the user (e.t., to move a cone to a particular location).

As discussed above, the user input data may indicate a set of objectives, goals, requests, etc., that may be associated with one or more objects in the environment. For example, referring to FIG. 1, the user input data may indicate that the user has request that the cone 120 be moved off of the box 110 to the left of the cylinder 130. The user input data may indicate that the objective of moving the cone 120 and the objective (e.g., moving the cone 120) may be associated with the cone 1320, the cylinder 130, and the box 110.

The user input module 340 may use various mechanisms, algorithms, systems, etc., to process and/or analyze the user input. The user input data may be generated using these various mechanisms, algorithms, systems, etc. For example, the user input module 340 may use a finite state transducer (FST) to process/analyze the user input. The FST may generate or output user input data based on the user input. In another example, the user input module 340 may use a combinatory categorical grammar (CCG) to process/analyze the user input. The CCG may generate or output user input data based on the user input. In a further example, the user input module 340 may use a machine learning model such as a neural network, a recurrent neural network (RNN), a long short-term memory (LSTM) network, etc., to process/analyze the user input. The machine learning model may generate or output user input data based on the user input. The user input data may be data that represents the user input and/or information in the user input, but is in a format that is usable, readable, accessible, etc., by the graph enhancement module 350. The user input module 340 may provide the user input data to the graph enhancement module 350.

In one embodiment, the graph enhancement module 350 may obtain a state graph generated by the graph module 330. For example, the graph enhancement module 350 may receive the state graph from the graph module 330 or may access the state graph from a storage device. As discussed above, the state graph may represent a set of objects within the environment and a set of positions/locations for the set of objects. The graph enhancement module 350 may also obtain the user input data generated by the user input module 340 based on a user input (e.g., a natural language input). For example, the graph enhancement module 350 may receive the user input data from the user input module 340 or may access the user input data from a storage device.

In one embodiment, the graph enhancement module 350 may update the state graph based on the user input data to generate an enhanced state graph, as discussed in more detail below. The enhanced state graph may include some or all of the nodes and/or edges that were in the state graph. For example, the enhanced state graph may include all of the nodes/edges in the state graph, and may include additional nodes/edges that were generated based on the user input data.

In one embodiment, the graph enhancement module 350 may generate the enhanced state graph by generating a set of goal nodes. The set of goal nodes may represent the set of objectives associated with the one or more objects of the set of objects. For example, each goal node may represent and/or be associated with an objective/goal that was indicated in the user input data. These goal nodes may be additional nodes that are added to the state graph to create the enhanced state graph.

In one embodiment, the graph enhancement module 350 may determine one or more additional properties of the set of objects in the environment based on the user input data. For example, if the user input indicates that the user wants to move a tennis ball to a certain location and only one of the objects in the environment is a sphere (or has a spherical shape), the graph enhancement module 350 may infer, determine, deduce, etc., that the sphere is a tennis ball. The graph enhancement module 350 may infer additional properties of the sphere based on the inference that the sphere is a tennis ball. For example, the graph enhancement module 350 may infer that the sphere has a fuzzy texture, has a neon green color, is a compressible object, etc.

In one embodiment, the graph enhancement module 350 may generate one or more additional properties nodes to represent the additional properties (that were inferred by the graph enhancement module 350). For example, each additional property may be represented using an additional property node. The graph enhancement module 350 may add these additional property nodes to the state graph to generate the enhanced state graph.

In one embodiment, the graph enhancement module 350 may determine one or more additional relationships between the set of objects in the environment based on the user input data. For example, if the user input indicates that the user wants to move a first object to the left of a second object, then the first object was initially to the right of the second object. The graph enhancement module 350 may infer these additional relationships based on the user input data.

In one embodiment, the graph enhancement module 350 may generate one or more additional relationship nodes to represent the additional relationship (that were inferred by the graph enhancement module 350). For example, each additional relationship may be represented using an additional relationship node and/or an edge between nodes. The graph enhancement module 350 may add these additional relationship nodes to the state graph to generate the enhanced state graph.

The graph enhancement module 350 may generate the enhanced state graph using various mechanism, functions, algorithms, systems, etc. For example, the graph enhancement module 350 may use a rule system/engine, a Markov decision process (MDP), a finite state machine (FSM), graph link prediction, Bayesian reasoning, inductive logic programming (ILP), In one embodiment, the graph enhancement module 350 may provide the enhanced state graph to the planning module 360 after generating the enhanced state graph (e.g., after adding additional nodes and/or edges to the state graph to generate the enhanced state graph). For example, the graph enhancement module 350 may transmit the enhanced state graph to the planning module 360, or may store the enhanced state graph on a storage device for the planning module 360 to access.

In one embodiment, the planning module 360 may obtain the enhanced state graph. For example, the planning module 360 may receive the enhanced state graph from the graph enhancement module 350 or may retrieve, access, etc., the enhanced state graph from a storage device. As discussed above, the enhanced state graph includes nodes (e.g., object nodes) that represent a set of objects in an environment and a set of positions/locations for the objects. The enhanced state graph includes nodes (e.g., property nodes) that represent properties of the objects. The enhanced state graph further includes nodes (e.g., goal nodes) that may represent one or more objectives associated with one or more of the objects.

In one embodiment, the planning module 360 may generate a set of instructions for the one or more mechanical systems 230, based on the enhanced state graph. The one or more mechanical systems 230 are able to interact with one or more of the set of objects within the environment. For example, the one or more mechanical systems 230 may be able to touch, move, come into contact with, etc., one or more of the set of objects. The set of instructions may indicate or cause the one or more mechanical systems 230 to perform a series of operations, actions, functions, etc., to perform the one or more objectives. For example, the set of instructions may instructor cause a robotic arm (e.g., a mechanical system 230) to grab an object and move an object to a location. The planning module 360 may operate the mechanical systems 230 based on the set of instructions. For example, the planning module 360 may transmit the instructions to the mechanical systems 230 or may execute the instructions.

In one embodiment, the planning module 360 may identify a set of locations for a subset of the set of objects. For example, the planning module 360 may determine which objects in the set of objects are associated with a goal/objective of the user (e.g., a goal/objective indicated in the user input received from a user and/or the user input data). The planning module 350 may determine a subset of the mechanical systems 230 based on the set of locations for the subset of the set of objects. For example, there may be five mechanical systems 230 (e.g., four robotic arms) but only two of the mechanical systems 230 are within reach of an object that is associated with an objective of a user (e.g., an object that the user wants to move). The planning module 360 may identify, select, etc., one or more of the two mechanical systems 230 that are within reach of the object. The planning module 360 may also generate instructions for the subset of the mechanical systems 230.

In one embodiment, planning module 360 may generate the set of instructions based on the goal nodes of the enhanced state graph. For example, the goal nodes may indicate one or more objectives/goals and one or more objects that are associated with the objectives/goals. The planning module 360 may determine which instructions should be generated for which mechanical systems 230 to achieve the objectives/goals.

In one embodiment, the planning module 360 may determine a portion of the environment based on the set of goal nodes. For example, the goal nodes may indicate that a first object is to be moved to the right of a second object. The planning module 360 may identify the portion of the environment that is to the right of the second object. The planning module 360 may determine whether a previously generated set of instructions will cause the mechanical system 230 to operate in the portion of the environment. For example, the planning module 360 may determine whether the instructions are for mechanical systems 230 that are unable to reach the right side of the second object. If the instructions cause the mechanical systems 230 to operate then the planning module 360 may regenerate the instructions to target mechanically systems 230 that are able to reach the right side of the second object. In another embodiment, the planning module 306 may identify and/or use only the mechanical systems 230 that are able to access the portion of the environment that is indicated by the set of goal nodes. For example, the planning module may identify the mechanical systems 230 that are able to reach the right side of the second object and may generate the instructions only for those mechanical systems 230.

In one embodiment, the planning module 360 may obtain an updated enhanced state graph. For example, the graph modules 330 and/or the graph enhancement module 350 may continually or periodically generate additional state graphs and/or enhanced state graphs as the environment changes (e.g., as objects in the environment change and/or move around). The updated enhanced state graph may indicate that an object has changed position. This may affect how the planning module should generate instructions for achieving a goal/objective. For example, if the original objected was to move a first object to the right of the second object, and the second object was moved further to the right, then the instructions for moving the first object may need to be updated. The graph module may generate a second set of instructions based on the updated enhanced state graph (e.g., based on a new enhanced state graph indicating that the position of the second object has changed).

Figure 4:
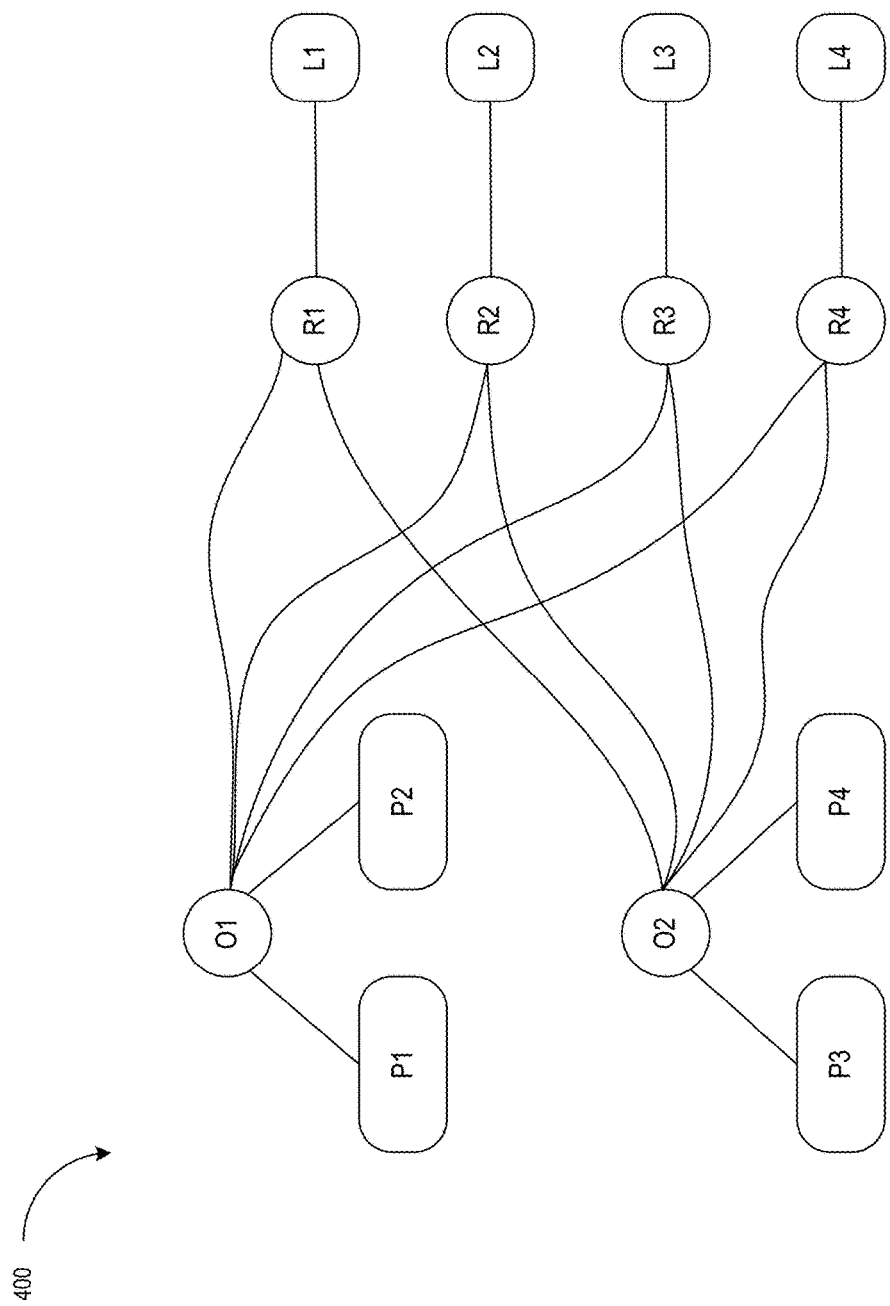
FIG. 4 is a diagram illustrating an example state graph, in accordance with some embodiments of the present disclosure.

FIG. 4 is a diagram illustrating an example state graph 400, in accordance with some embodiments of the present disclosure. As discussed above, a human interaction system (e.g., the graph module 330 of the human interaction system 220 illustrated in FIG. 2) may generate, determine, calculate, etc., the state graph 400. The state graph 400 may indicate, represent, etc., the various objects within the environment, based on the sensor data. For example, referring to FIG. 1, the state graph 400 may indicate the objects 120 and 130 in the environment 100.

The state graph 400 includes object nodes O1 (e.g., object 120 in FIG. 1) and O2 (e.g., object 130 in FIG. 1). The object node O1 is connected to property nodes P1 and P2. Nodes P1 and P2 may indicate or represent properties of the object 120. For example, P1 may indicate the shape of object 120 and P2 may indicate the color of object 120. In some embodiments, the edges or connections between a node may indicate the type of node. For example, the edge between O1 and P1 may indicate that the property of the node is the color, and the node P1 itself may indicate the value of the color (e.g., green, blue, etc.). The object node O2 is connected to the property nodes P3 and P4. Nodes P3 and P4 may indicate or represent properties of the object 130. For example, P3 may indicate the shape of object 120 and P4 may indicate the color of object 130. The object node O1 is also connected to node R1, R2, R3, and R4. Nodes R1 through R4 may be relationship nodes that are used to indicate relationships between different pairs of objects. The edges between nodes R1 through R4 and nodes L1 through L4 may indicate the type of relationship (e.g., direction, relative location, orientation, etc.). Nodes L1 through L4 may be indicate the values of the relationships. For example, L1 may indicate that the object 120 is to the left of object 130.

Figure 5:
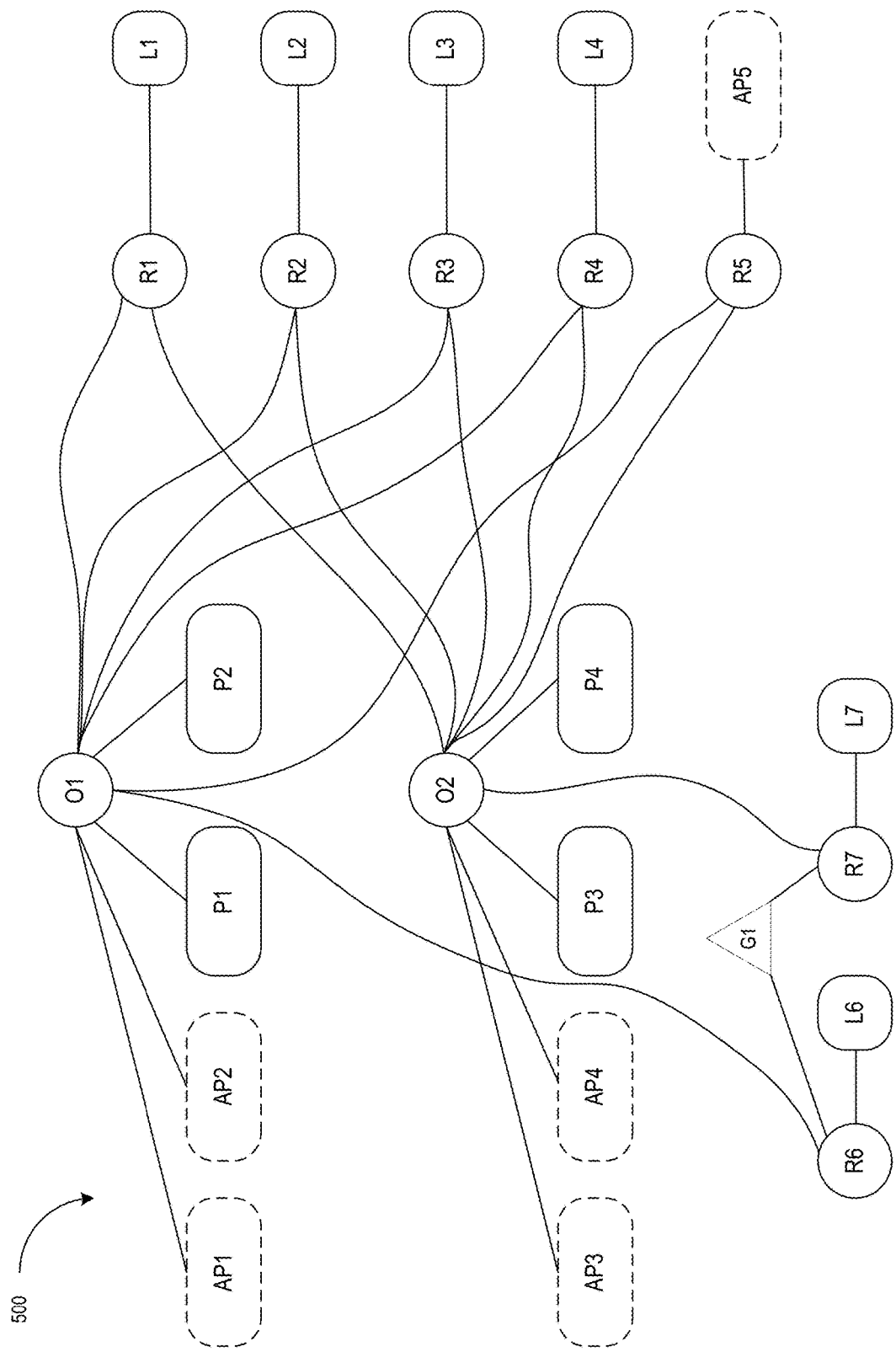
FIG. 5 is a diagram illustrating an example enhanced state graph, in accordance with some embodiments of the present disclosure.

FIG. 5 is a diagram illustrating an example enhanced state graph 500, in accordance with some embodiments of the present disclosure. As discussed above, a human interaction system (e.g., the graph module 330 of the human interaction system 220 illustrated in FIG. 2) may generate, determine, calculate, etc., the enhanced state graph 500 based on the state graph 400 and user input data. The enhanced state graph 500 may indicate, represent, etc., the various objects within the environment, based on the sensor data. For example, referring to FIG. 1, the enhanced state graph 500 may indicate the objects 120 and 130 in the environment 100.

The enhanced state graph 500 includes object nodes O1 (e.g., object 120 in FIG. 1) and O2 (e.g., object 130 in FIG. 1). The object node O1 is connected to property nodes P1 and P2. Nodes P1 and P2 may indicate or represent properties of the object 120. For example, P1 may indicate the shape of object 120 and P2 may indicate the color of object 120. In some embodiments, the edges or connections between a node may indicate the type of node. For example, the edge between O1 and P1 may indicate that the property of the node is the color, and the node P1 itself may indicate the value of the color (e.g., green, blue, etc.). The object node O2 is connected to the property nodes P3 and P4. Nodes P3 and P4 may indicate or represent properties of the object 130. For example, P3 may indicate the shape of object 120 and P4 may indicate the color of object 130. The object node O1 is also connected to node R1, R2, R3, and R4. Nodes R1 through R4 may be relationship nodes that are used to indicate relationships between different pairs of objects. The edges between nodes R1 through R4 and nodes L1 through L4 may indicate the type of relationship (e.g., direction, relative location, orientation, etc.). Nodes L1 through L4 may be indicate the values of the relationships. For example, L1 may indicate that the object 120 is to the left of object 130.

The enhanced state graph 500 also includes additional property nodes AP1 through AP5. The additional property nodes AP1 through AP5 may be determined based on the user input data. In particular, the additional property nodes AP1 through AP5 may be inferred properties that are inferred based on the user input data. For example, AP1 may indicate the property "green" based on a user input indicating that the object is a tennis ball.

The enhanced state graph 500 also includes a goal node G1. The goal node G1 is coupled to relationship nodes R6 and R7. The relationship nodes R6 and R7 may indicate a new relationship between the objects 120 and 130 after a goal, objectives, etc., of the user is achieved. For example, object 120 may currently be to the left of object 130. After the object of moving object 120 is achieved, object 120 may be to the right of object 130. Nodes L6 and L7 may indicate the values of the relationships represented by R6 and R7.

Figure 6:
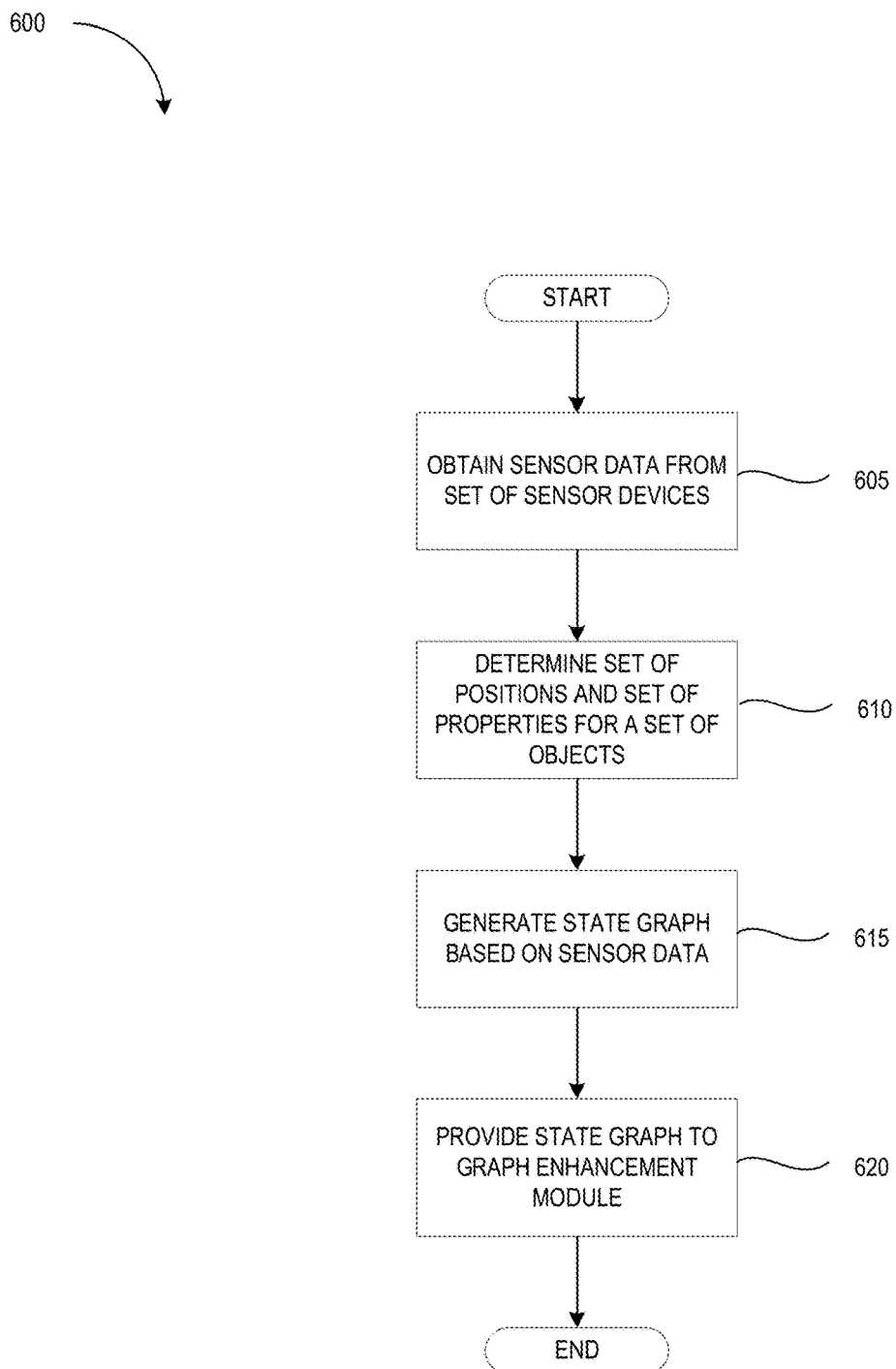
FIG. 6 is a flow diagram illustrating an example method of generating a state graph, in accordance with some embodiments of the present disclosure.

FIG. 6 is a flow diagram illustrating an example method of generating a state graph, in accordance with some embodiments of the present disclosure. Method 600 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. For example, the method 600 described with reference to FIG. 6 may be performed by a human interaction system, a graph module, etc.

At block 605, the processing logic may obtain sensor data from a set of sensor devices. For example, the processing logic may receive the sensor data or may retrieve the sensor data from a storage device. The sensor data may indicate, depict, etc., a set of objects that are located within an environment. At block 610, the processing logic may determine a set of positions (e.g., locations) and a set of properties for the set of objects in the environment. For example, the processing logic may use machine learning models to identify different objects in the environment and locations/positions of the objects within the environment, based on the sensor data.

At block 615, the processing logic may generate a state graph based on the sensor data. For example, the processing logic may generate a state graph with object nodes, property nodes, relationship nodes, etc., based on the sensor data, as discussed above. The processing logic may provide the state graph to a graph enhancement module at block 620. The graph enhancement module may add additional nodes and/or edges to the graph to generate an enhanced state graph, as discussed above.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation. In addition, additional operations/blocks (not illustrated in FIG. 6) may be added in between the operations/blocks illustrated in the FIG. 6.

Figure 7:
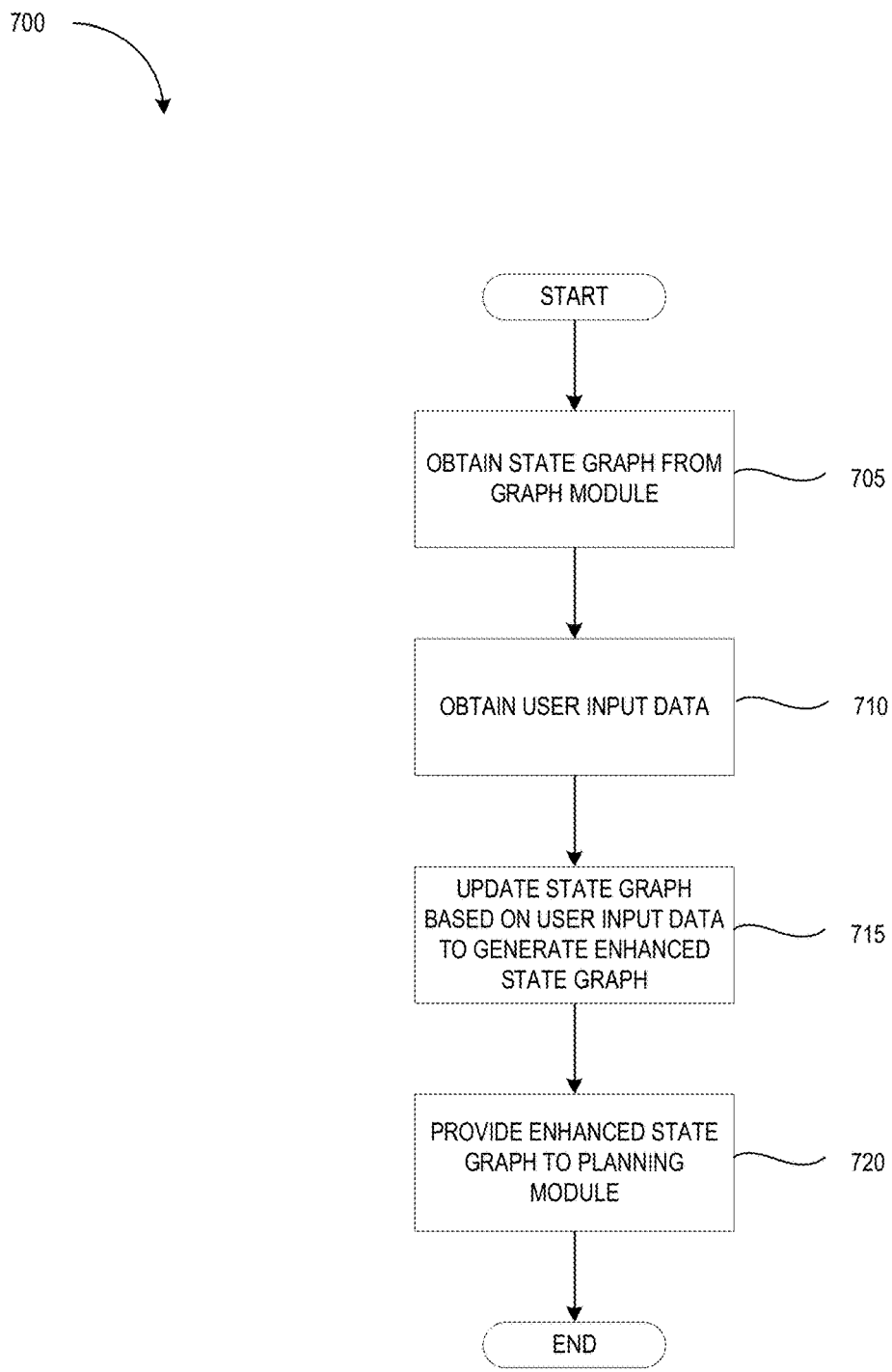
FIG. 7 is a flow diagram illustrating an example method of generating an enhanced state graph, in accordance with some embodiments of the present disclosure.

FIG. 7 is a flow diagram illustrating an example method of generating an enhanced state graph, in accordance with some embodiments of the present disclosure. Method 700 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. For example, the processes described with reference to FIG. 7 may be performed by a human interaction system, a graph enhancement module, etc.

At block 705, the processing logic may obtain a state graph from a graph module. For example, the processing logic may receive the state graph from the graph module or may retrieve/access the state graph from a storage device. The processing logic may obtain user input data at block 710. The processing logic may generate the user input data based on user input. For example, a user may provide user input (e.g., speech, audio, text, etc.) indicating one or more objectives/goals associated with one or more objects in an environment. The user input may be a natural language input. The processing logic may generate the user input data by processing the user input. For example, the processing logic may perform natural language processing on the user input to obtain the user input data.

At block 715, the processing logic may update the state graph based on the user input data to generate an enhanced state graph, as discussed above. For example, the processing logic may generate additional nodes based on the user input data. The additional nodes may be additional relationship nodes generated based on the user input data. The additional nodes may also be additional property nodes generated based on the user input data. The additional nodes may also be goal nodes generated based on the user data. At block 720, the processing logic may provide the enhanced state graph to a planning module. The planning module may generate one or more instructions for one or more mechanical systems based on the enhanced state graph, as discussed above.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation. In addition, additional operations/blocks (not illustrated in FIG. 7) may be added in between the operations/blocks illustrated in the FIG. 7.

Figure 8:
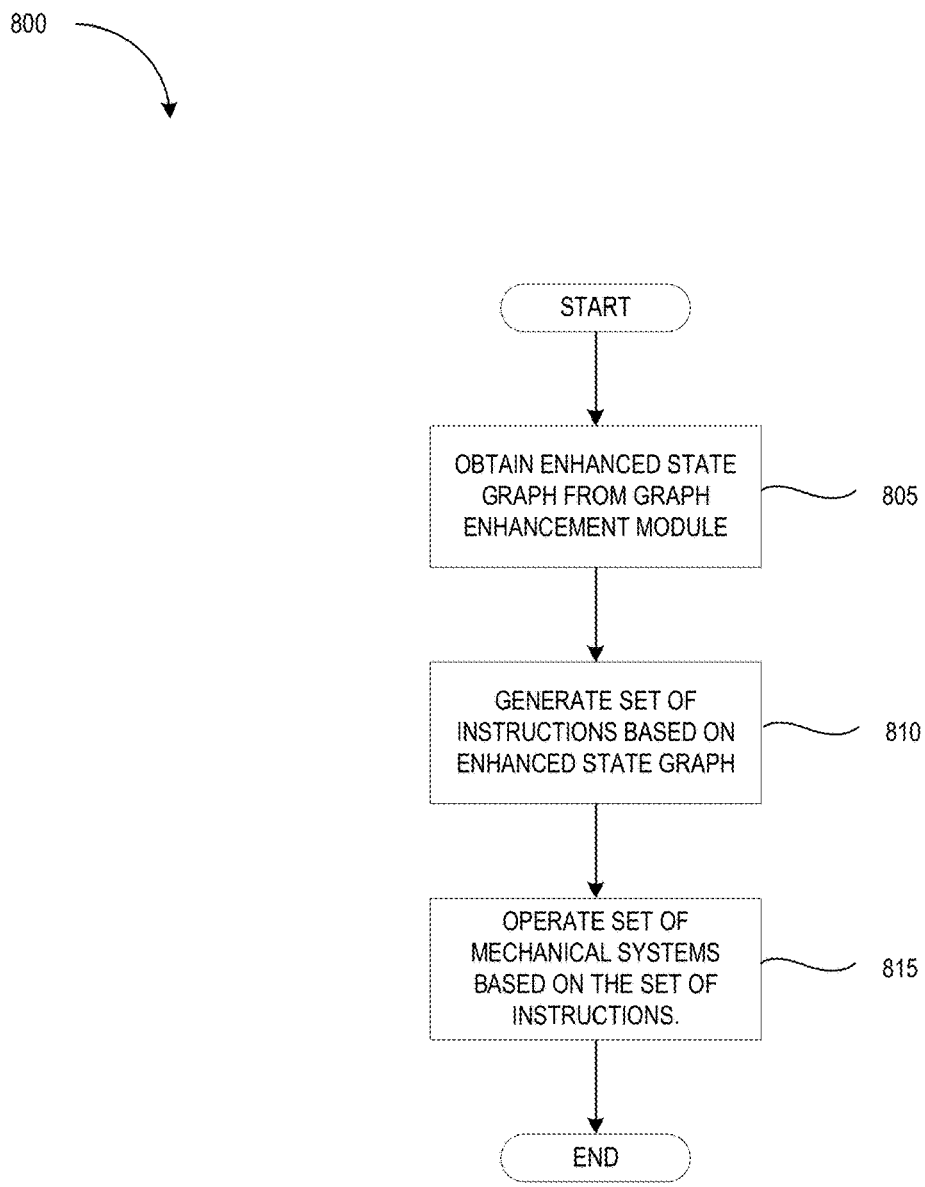
FIG. 8 is a flow diagram illustrating an example method of operating a set of mechanical systems, in accordance with some embodiments of the present disclosure.

FIG. 8 is a flow diagram illustrating an example method 800 of operating a set of mechanical systems, in accordance with some embodiments of the present disclosure. Method 80 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. For example, the processes described with reference to FIG. 8 may be performed by a human interaction system, a planning module, etc.

The method 800 starts at block 805 where the processing logic obtains an enhanced state graph from a graph enhancement module. For example, the processing logic may receive the enhanced state graph from the graph enhancement module or may retrieve/access the enhanced state graph from a storage device. At block 810, the processing logic may generate a set of instructions based on the enhanced state graph. For example, the processing logic may identify a subset of a set of mechanical systems in the environment and may generate the set of instructions for the subset of mechanical systems. In another example, the processing logic may determine different portions of the environment based on goal nodes in the enhanced state graphs. The processing logic may generate instructions that cause the set of mechanical systems to operate with a specific portion of the environment.

At block 815, the processing logic may operate a set of mechanical systems based on the set of instructions. For example, the processing logic may execute the set of instructions. In another example, the processing logic may provide the set of instructions to the mechanical systems and the mechanical systems may execute the set of instructions.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation. In addition, additional operations/blocks (not illustrated in FIG. 8) may be added in between the operations/blocks illustrated in the FIG. 8.

Figure 9:
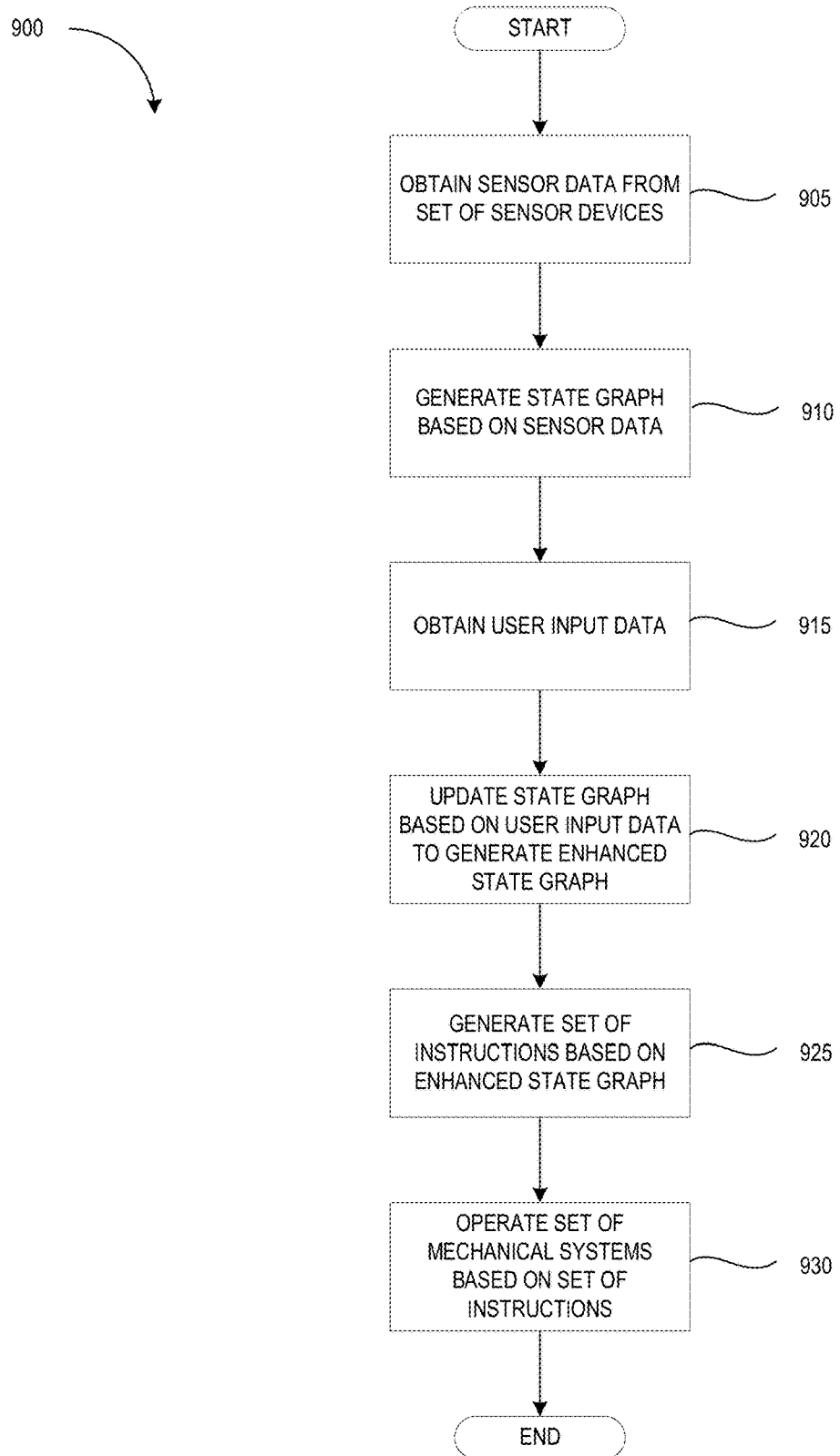
FIG. 9 is a flow diagram illustrating an example method of interacting with machines using natural language input, in accordance with some embodiments of the present disclosure.

FIG. 9 is a flow diagram illustrating an example method 900 of interacting with machines using natural language input, in accordance with some embodiments of the present disclosure. Method 900 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. For example, the processes described with reference to FIG. 9 may be performed by a human interaction system and/or various modules of human interaction system.

At block 905, the processing logic may obtain sensor data from a set of sensor devices. The sensor data may indicate, depict, etc., a set of objects that are located within an environment. At block 615, the processing logic may generate a state graph based on the sensor data. For example, the processing logic may determine a set of positions (e.g., locations) and a set of properties for the set of objects in the environment. The processing logic may also generate a state graph with object nodes, property nodes, relationship nodes, etc., based on the sensor data, as discussed above. The processing logic may obtain user input data at block 915. The processing logic may generate the user input data based on user input. The user input may a natural language input. The processing logic may generate the user input data by processing the user input.

At block 920, the processing logic may update the state graph based on the user input data to generate an enhanced state graph, as discussed above. The processing logic may generate additional nodes based on the user input data and add them to the state graph. The additional nodes may be additional relationship nodes, additional property nodes and/or goal nodes generated based on the user data. At block 925, the processing logic may generate a set of instructions based on the enhanced state graph. At block 930, the processing logic may operate a set of mechanical systems based on the set of instructions.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation. In addition, additional operations/blocks (not illustrated in FIG. 9) may be added in between the operations/blocks illustrated in the FIG. 9.

Figure 10:
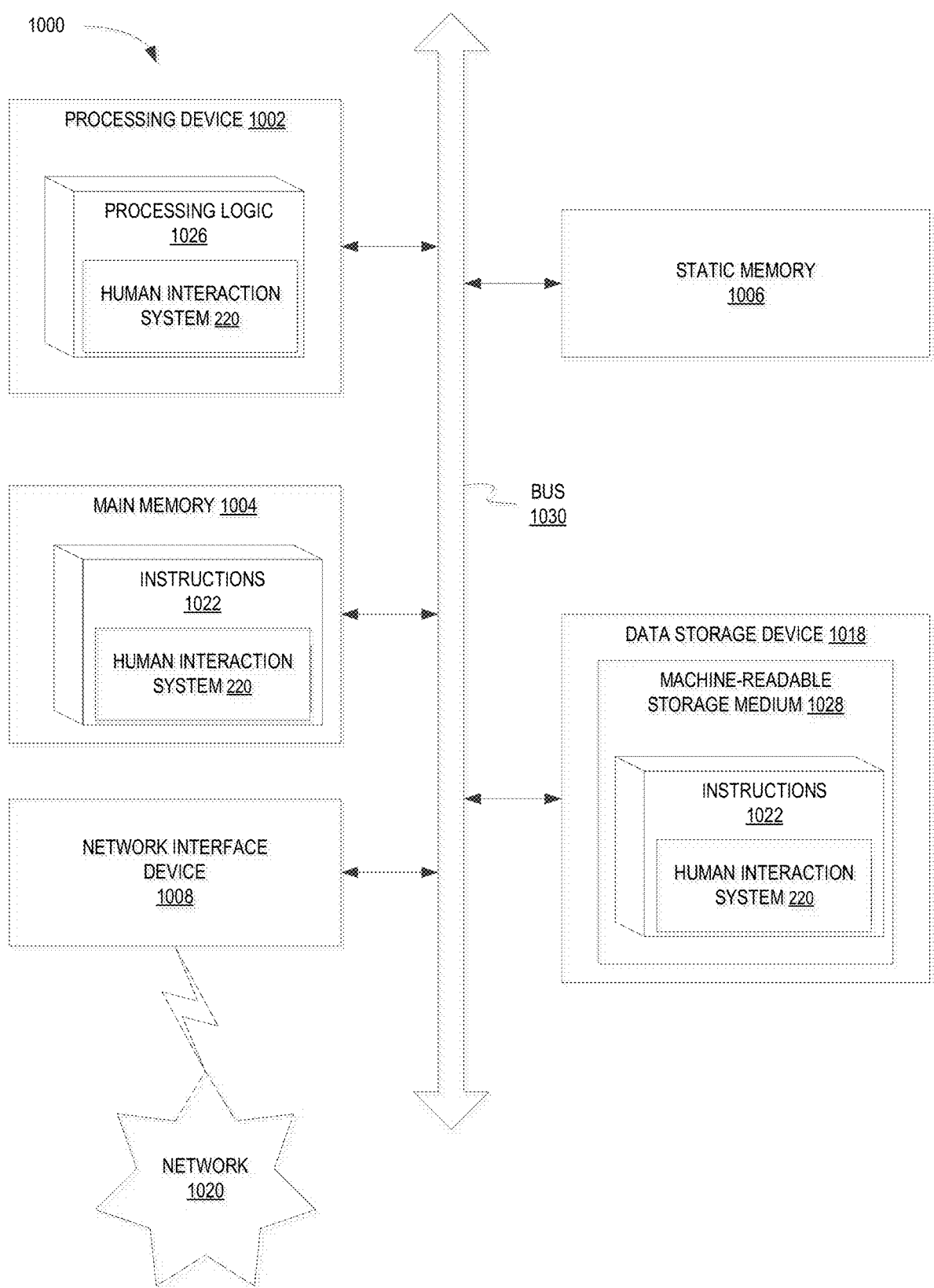
FIG. 10 is an illustration showing an example computing device which may implement the embodiments described herein.

FIG. 10 is an illustration showing an example computing device 100 which may implement the embodiments described herein. A set of instructions 1022 in the computing device may cause computing device to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1000 may be representative of a server computer system, such as system 100.

The exemplary computer system 1000 includes a processing device 1002, a main memory 1004 (e.g., read-only memory (ROM), flash memory, dynamic random access memory (DRAM), a static memory 1006 (e.g., flash memory, static random access memory (SRAM), etc.), and a data storage device 1018, which communicate with each other via a bus 1030. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute processing logic 1026, which may be one example of human interaction system 220 shown in FIG. 1, for performing the operations and steps discussed herein.

The data storage device 1018 may include a machine-readable storage medium 1028, on which is stored one or more set of instructions 1022 (e.g., software) embodying any one or more of the methodologies of functions described herein, including instructions to cause the processing device 1002 to execute human interaction system 220. The instructions 1022 may also reside, completely or at least partially, within the main memory 1004 or within the processing device 1002 during execution thereof by the computer system 1000; the main memory 1004 and the processing device 1002 also constituting machine-readable storage media. The instructions 1022 may further be transmitted or received over a network 1020 via the network interface device 1008.

The machine-readable storage medium 1028 may also be used to store instructions to perform the methods and operations described herein. While the machine-readable storage medium 1028 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method, comprising:
  obtaining an enhanced state graph, wherein:

the enhanced state graph represents a set of objects within an environment and a set of positions of the set of objects within the environment;

the enhanced state graph comprises a set of object nodes to represent the set of objects;

the enhanced state graph comprises a set of property nodes to represent a set of properties of the set of objects; and the enhanced state graph comprises a set of goal nodes to represent a set of objectives associated with a subset of the set of objects;

generating a set of instructions for a set of mechanical systems based on the enhanced state graph, wherein the set of mechanical systems is configured to interact with one or more of the set of objects within the environment;

operating the set of mechanical systems to achieve the set of objectives based on the set of instructions;

determining a portion of the environment based on the set of goal nodes, wherein the portion of the environment is associated with the set of objectives; and determining whether the set of instructions cause the set of mechanical systems to operate within the portion of the environment.

2. The method of claim 1, further comprising:

identifying a set of locations for the subset of the set of objects; and identifying a subset of the set of mechanical systems based on the set of locations.

3. The method of claim 2, wherein generating the set of instructions comprises:

generating the set of instructions for the subset of the set of mechanical systems.

4. The method of claim 1, wherein generating the set of instructions is further based on the set of goal nodes of the enhanced state graph.

5. The method of claim 1, further comprising:

in response to determining that the set of instructions do not cause the set of mechanical systems to operate within the portion of the environment, generating a second set of instructions for the set of mechanical systems based on the enhanced state graph.

6. The method of claim 1, wherein the enhanced state graph is generated based on natural language input from a user.

7. The method of claim 1, further comprising:

obtaining an updated enhanced state graph;

generating a second set of instructions for the set of mechanical systems based on the updated enhanced state graph, wherein the set of mechanical systems is configured to interact with one or more of the set of objects within the environment; and operating the set of mechanical systems to achieve the set of objectives based on the set of instructions.

8. An apparatus, comprising:

a memory to store a binary code of a controller; and a processing device, operatively coupled to the memory, to:

obtain an enhanced state graph, wherein:

the enhanced state graph represents a set of objects within an environment and a set of positions of the set of objects within the environment;

the enhanced state graph comprises a set of object nodes to represent the set of objects;

the enhanced state graph comprises a set of property nodes to represent a set of properties of the set of objects; and the enhanced state graph comprises a set of goal nodes to represent a set of objectives associated with a subset of the set of objects;

generate a set of instructions for a set of mechanical systems based on the enhanced state graph, wherein the set of mechanical systems is configured to interact with one or more of the set of objects within the environment;

operate the set of mechanical systems to achieve the set of objectives based on the set of instructions;

determine a portion of the environment based on the set of goal nodes, wherein the portion of the environment is associated with the set of objectives; and determine whether the set of instructions cause the set of mechanical systems to operate within the portion of the environment.

9. The apparatus of claim 8, wherein the processing devices is further to:

identify a set of locations for the subset of the set of objects; and identify a subset of the set of mechanical systems based on the set of locations.

10. The apparatus of claim 9, wherein to generate the set of instructions the processing devices is further to:

generate the set of instructions for the subset of the set of mechanical systems.

11. The apparatus of claim 8, wherein generating the set of instructions is further based on the set of goal nodes of the enhanced state graph.

12. The apparatus of claim 8, wherein the processing devices is further to:

in response to determining that the set of instructions do not cause the set of mechanical systems to operate within the portion of the environment, generate a second set of instructions for the set of mechanical systems based on the enhanced state graph.

13. The apparatus of claim 8, wherein the enhanced state graph is generated based on natural language input from a user.

14. The apparatus of claim 8, wherein the processing devices is further to:

obtain an updated enhanced state graph;

generate a second set of instructions for the set of mechanical systems based on the updated enhanced state graph, wherein the set of mechanical systems is configured to interact with one or more of the set of objects within the environment; and operate the set of mechanical systems to achieve the set of objectives based on the set of instructions.

15. A non-transitory computer-readable storage medium having instructions stored thereon that, when executed by a processing device, cause the processing device to:

obtain an enhanced state graph, wherein:

the enhanced state graph represents a set of objects within an environment and a set of positions of the set of objects within the environment;

the enhanced state graph comprises a set of object nodes to represent the set of objects;

the enhanced state graph comprises a set of property nodes to represent a set of properties of the set of objects; and the enhanced state graph comprises a set of goal nodes to represent a set of objectives associated with a subset of the set of objects;

generate a set of instructions for a set of mechanical systems based on the enhanced state graph, wherein the set of mechanical systems is configured to interact with one or more of the set of objects within the environment;

operate the set of mechanical systems to achieve the set of objectives based on the set of instructions;

determine a portion of the environment based on the set of goal nodes, wherein the portion of the environment is associated with the set of objectives; and determine whether the set of instructions cause the set of mechanical systems to operate within the portion of the environment.

16. The non-transitory computer-readable storage medium of claim 15, wherein the instructions further cause the processing device to:

identify a set of locations for the subset of the set of objects; and identify a subset of the set of mechanical systems based on the set of locations.

17. The non-transitory computer-readable storage medium of claim 16, wherein generating the set of instructions comprises:

generating the set of instructions for the subset of the set of mechanical systems.

18. The non-transitory computer-readable storage medium of claim 15, wherein generating the set of instructions is further based on the set of goal nodes of the enhanced state graph.

\* \* \* \* \*